United States Patent [19]
DeKoning et al.

[11] Patent Number: 5,941,994
[45] Date of Patent: Aug. 24, 1999

[54] TECHNIQUE FOR SHARING HOT SPARE DRIVES AMONG MULTIPLE SUBSYSTEMS

[75] Inventors: Rodney A. DeKoning; Gerald Fredin, both of Wichita, Kans.

[73] Assignee: LSI Logic Corporation, Milpitas, Calif.

[21] Appl. No.: 08/577,311

[22] Filed: Dec. 22, 1995

[51] Int. Cl.[6] .................................................. G06F 11/00
[52] U.S. Cl. .................................................. 714/7; 714/48
[58] Field of Search .................... 395/182.04, 182.05, 395/182.07, 182.03, 182.06, 182.09, 182.1, 182.11; 371/51.1; 711/150, 148, 162, 114, 112; 714/4, 5, 9, 10, 54, 48, 150

[56] References Cited

U.S. PATENT DOCUMENTS

| | | | |
|---|---|---|---|
| 4,639,864 | 1/1987 | Katzman et al. | 395/182.2 |
| 4,761,785 | 8/1988 | Clark et al. | 371/51.1 |
| 4,914,656 | 4/1990 | Dunphy et al. | 371/10.2 |
| 5,155,845 | 10/1992 | Beal et al. | 395/812.04 |
| 5,193,175 | 3/1993 | Cutt, Jr. et al. | 395/182.09 |
| 5,202,887 | 4/1993 | Ueno et al. | 395/182.06 |
| 5,210,866 | 5/1993 | Milligan et al. | 395/575 |
| 5,212,784 | 5/1993 | Sparks | 395/182.04 |
| 5,271,012 | 12/1993 | Blaum et al. | 371/101 |
| 5,331,646 | 7/1994 | Krueger et al. | 371/40.1 |
| 5,357,509 | 10/1994 | Ohizumi | 395/182.05 |
| 5,390,186 | 2/1995 | Murata et al. | 395/182.06 |
| 5,402,428 | 3/1995 | Kakuta et al. | 395/182.04 |
| 5,469,453 | 11/1995 | Glider et al. | 371/40.4 |
| 5,530,850 | 6/1996 | Ford et al. | 395/182.04 |
| 5,566,316 | 10/1996 | Fechner et al. | 395/182.04 |
| 5,574,863 | 11/1996 | Nelson et al. | 395/182.04 |
| 5,657,439 | 8/1997 | Jones et al. | 395/182.06 |
| 5,666,512 | 9/1997 | Nelson et al. | 395/182.04 |
| 5,668,943 | 9/1997 | Attanasio et al. | 395/182.05 |
| 5,812,748 | 9/1998 | Ohran et al. | 395/182.09 |

Primary Examiner—Joseph E. Palys
Attorney, Agent, or Firm—Wayne P. Bailey; Duke W. Yee

[57] ABSTRACT

A data processing system that includes an improved architecture for providing hot spare storage devices. Specifically, the data processing includes a bus that is connected to one or more computer systems and a number of storage subsystems. Each storage subsystem includes storage devices and a controller. The controller in a storage subsystem provides the connection to the bus and an interface for controlling data transfers to and from the storage device. A backup storage system is connected to the bus. The data processing system also includes a detection means for detecting a failure of a storage device within one of the plurality of storage subsystems and a backup means for using the backup storage device to replace the failed storage device.

34 Claims, 5 Drawing Sheets

TECHNIQUE FOR SHARING HOT SPARE DRIVES AMONG MULTIPLE SUBSYSTEMS

BACKGROUND OF THE INVENTION

1. Technical Field

The present invention relates generally to an improved data processing system, and in particular to an improved storage architecture in a data processing system. Still more particularly, the present invention relates to a method and apparatus for providing a spare storage device in a data processing system.

2. Description of the Related Art

In data processing systems, inexpensive high performance, high reliability memory is desirable. It is expensive to provide high reliability capability for various memory devices that are used within a data processing system. The problem becomes especially severe in the case of disk drive memory systems. Large disk drives capable of storing over one gigabyte of data are available. The processor in the data processing system stores data files on the disk drive memory by writing the data for all files onto a single disk drive. The failure of such a single disk drive can result in the loss of significant amounts of data. Disk drives are built to be high reliability units to minimize the possibility of this catastrophic loss of data. The cost of reliability is high in that the cost of the disk drive is expensive.

In critical situations, where the loss of data stored on the drive could cause a significant disruption in the operation of the processor in the data processing system, additional reliability may be obtained by disk shadowing or backing up each disk drive with an additional redundant disk drive. The provision of a second disk drive, however, to back up the primary disk drive will typically more than double the cost of storage for the data processing system. Various storage architectures have been presented to reduce the cost of providing disk shadowing backup protection. One architecture involves storing only changes that are made to the data stored on the disk drive and backing up only the most critical data stored on the disk drive and only periodically backing up data that is stored on the disk drive by storing it on a much less expensive data storage unit that also has a much slower data retrieval access time.

Another alternative includes using a number of smaller sized disk drives interconnected in a parallel array. In such a system, the microprocessor in the data processing system views the array of storage devices as a very large logical storage device with logical tracks thereon. Each logical track would be many times larger than any physical track extent of any of the physical storage devices forming the array. Such an architecture is often referred to as a direct access storage device (DASD) array, which includes a set of synchronously selected and operated DASDs.

One particular form of a DASD array is a redundant array of inexpensive disks (RAID) storage system, which has emerged as an alternative to large, expensive disk drives for use within data processing systems. Five different RAID levels are described in an article entitled "A Case For Redundant Arrays of Inexpensive Disks (RAID)" by David Patterson, et al., University of California Berkeley Report, No. UCD/CSD 87/391, December 1987. In traditional RAID systems, configurations typically involve one or two controllers that share drives in a protected environment. In this environment, disk drives are managed fairly simply because they are easily identified with the subsystem to which they are attached.

Figure 1:
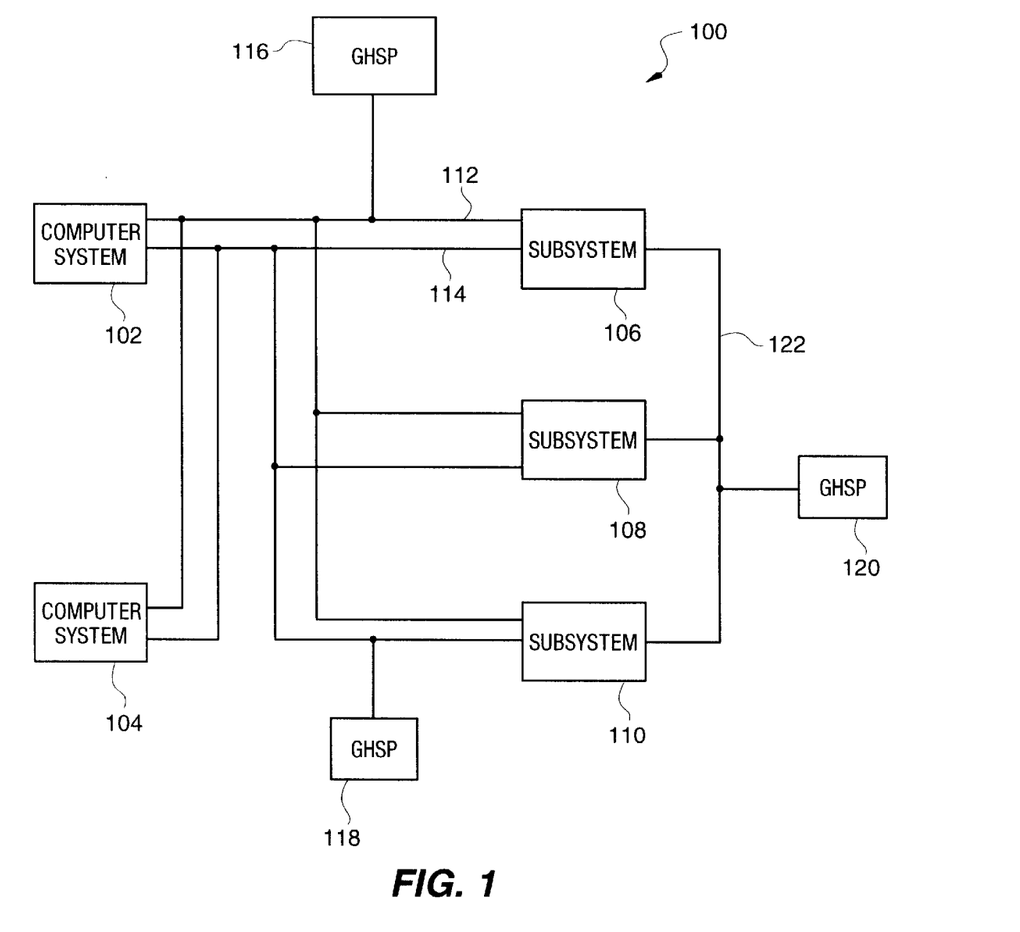
FIG. 1 is a data processing system according to the present invention.

For example, in U.S. Pat. No. 5,210,866, to Milligan, et al., a parallel disk drive array data storage system 100 is shown in FIG. 1 in which spare disk drives 125-1 to 125-R are switchably interconnectable in place of a failed disk drive, such as disk drives 122-1 to 122-n+m. These spare disk drives are also called "hot spare devices" (HSD).

Such an architecture provides for higher availability of data to the user, as well as high performance as a result of a quicker return to optimal redundancy modes after a device failure. Many data processing systems, however, contain more than one disk drive subsystem. Each of these disk drive subsystems presently require HSDs to be designated within each subsystem. It is desirable, however, to have as few HSDs as possible within a data processing system containing multiple storage device subsystems.

Therefore, it would be advantageous to have an improved method and apparatus for providing redundancy in a data processing system while minimizing the number of HSDs required.

SUMMARY OF THE INVENTION

The present invention provides a data processing system that includes an improved architecture for providing hot spare storage devices. Specifically, the data processing system includes a bus that is connected to one or more computer systems and a number of storage subsystems. Each storage subsystem includes storage devices and a controller. The controller in a storage subsystem provides the connection to the bus and an interface for controlling data transfers to and from the storage device. A backup storage system is connected to the bus. The data processing system also includes a detection means for detecting a failure of a storage device within one of the plurality of storage subsystems and a backup means for using the backup storage device to replace the failed storage device.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

With reference now to the figures, and in particular with reference to FIG. 1, a data processing system 100 is depicted according to the present invention. Data processing system 100 includes computer systems 102 and 104 connected to subsystems 106, 108, and 110. These subsystems are disk drive subsystems in the depicted example. Computer systems 102 and 104 are connected to subsystems 106, 108, and 110 by bus 112 and bus 114. According to the present invention, bus 112 and bus 114 may be implemented using a number of different bus architectures, such as a small computer system interface (SCSI) bus or a fibre channel bus. More information on fibre channel may be found in Stephens, *Fibre Channel*, Volume 1: The Basics, ANCOT Corporation (1995).

Additionally, data processing system 100 includes global hot spare pools (GHSPs) 116, 118, and 120. Global hot spare pool (GHSP) 116, GHSP 118, and GHSP 120 each include disk drives in the depicted example. GHSPs 116, 118, and 120 are employed to provide hot spare devices (HSDs). GHSP 120 is connected to storage subsystems 106, 108, and 110 by bus 122. The disk drives in these GHSPs are shared between subsystems 106, 108, and 110 according to the present invention. These GHSPs are used to reduce the number of HSDs required in data processing system 100.

Figure 2:
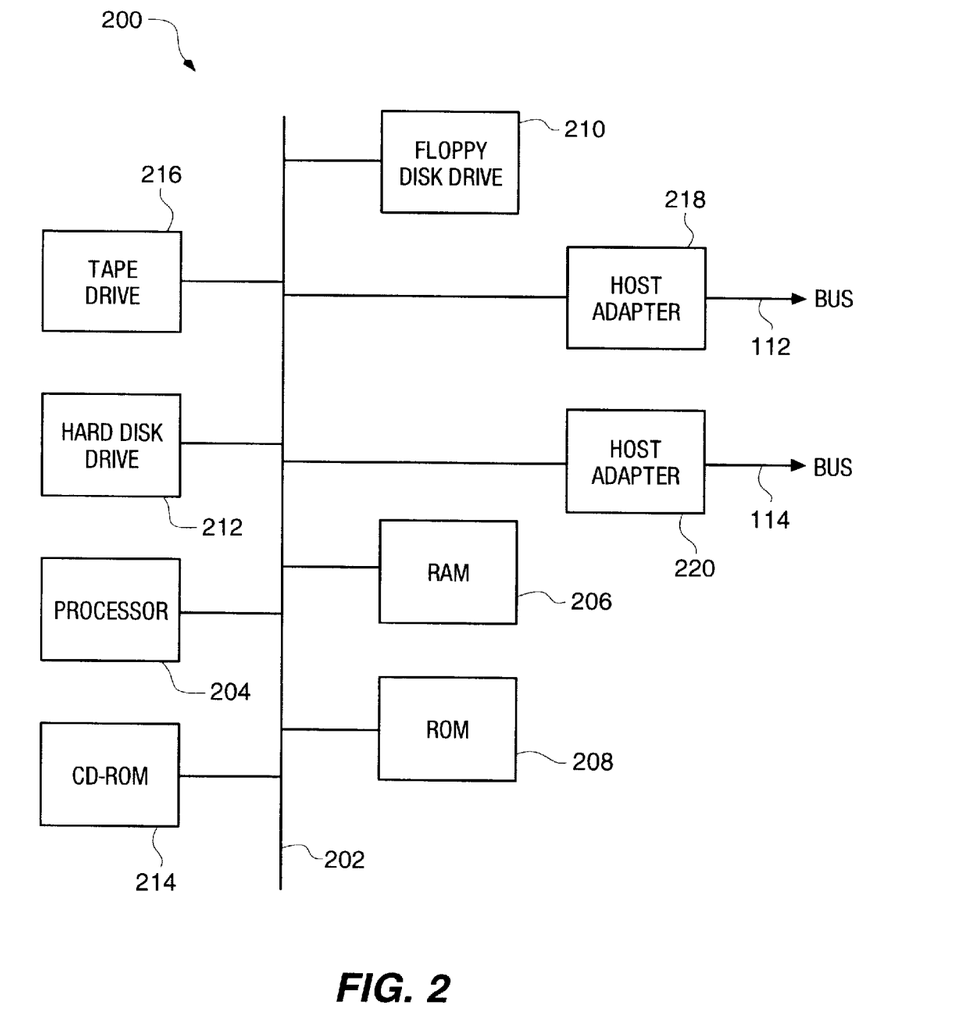
FIG. 2 is a block diagram of a computer system in which the present invention may be implemented.

Turning now to FIG. 2, a block diagram of a computer system 200, such as computer system 102 or 104 in FIG. 1, is illustrated in which the present invention may be implemented. Computer system 200 includes a system bus 202 connected to a processor 204 and a memory 206. Computer system 200 also includes a read only memory (ROM) 208, which may include programs and data, such as, for example, a basic input/output system that provides transparent communications between different input/output (I/O) devices. In the depicted example, computer system 200 also includes storage devices, such as floppy disk drive 210, hard disk drive 212, CD-ROM 214, and tape drive 216.

Computer system 200 sends and receives data to storage subsystems, such as storage subsystems 106, 108, or 110 in FIG. 1 through host adapters 218 and 220. A storage subsystem is a collection of storage devices managed separately from the primary processing system, such as a personal computer, a work station, or a network server. A storage subsystem includes a controller that manages the storage devices and provides an interface to the primary processing system to provide access to the storage devices within the storage subsystem. A storage system is typically physically separate from the primary processing system and may be located in a remote location, such as in a separate room. These host adapters provide an interface to send and receive data to and from subsystems in a data processing system.

Programs supporting functions within host system 200 are executed by processor 204. While any appropriate processor can be used for processor 204, the Pentium microprocessor, which is sold by Intel Corporation and the Power PC 620, available from International Business Machines Corporation and Motorola, Inc. are examples of suitable processors. "Pentium" is a trademark of the Intel Corporation and "Power PC" is a trademark of International Business Machines Corporation.

Additionally, databases and programs may be found within a storage device, such as a hard disk drive 212. Data used by processor 204 and other instructions executed by processor 204 may be found in RAM 206 and ROM 208.

Figure 3:
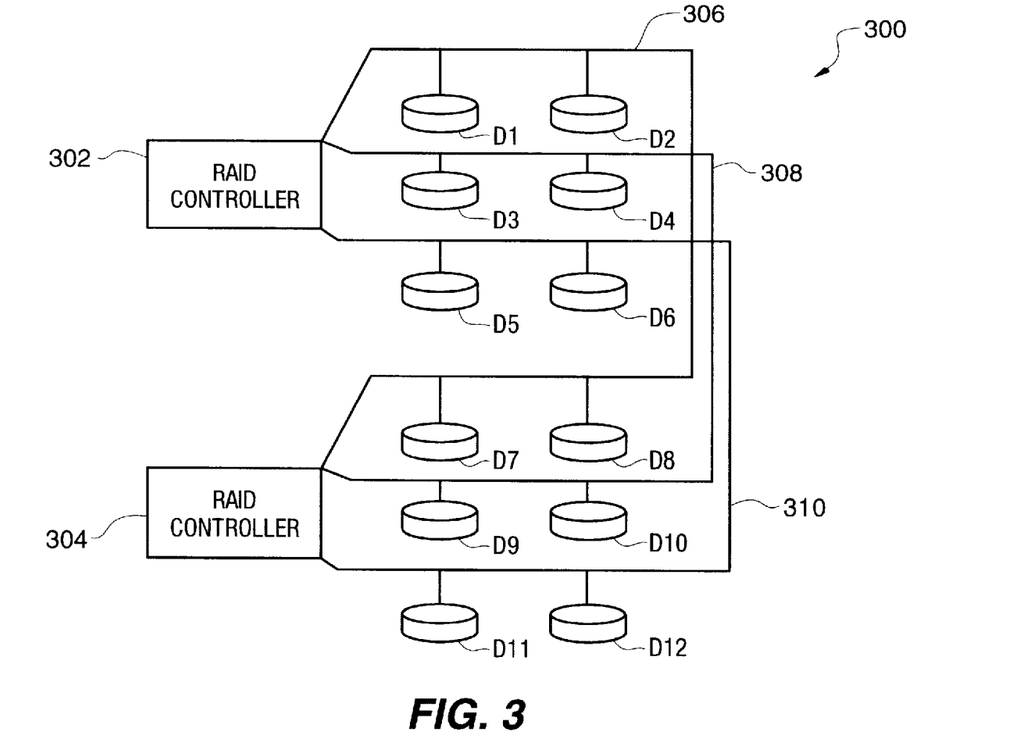
FIG. 3 is a block diagram of a subsystem, such as subsystems from FIG. 1, according to the present invention.

With reference now to FIG. 3, a block diagram of a storage subsystem, such as storage subsystems 106, 108, or 110 from FIG. 1, is depicted according to the present invention. In the depicted example, subsystem 300 is a disk drive system containing controllers 302 and 304. Controller 302 is connected to bus 112 while controller 304 is connected to bus 114 (see FIG. 1). These two controllers control disk drives D1–D12 and the transfer of data to and from disk drives D1–D12 on buses 306, 308, and 310. In the depicted example, subsystem 300 may be configured in a RAID level 1, 3, or 5 configuration.

Figure 4:
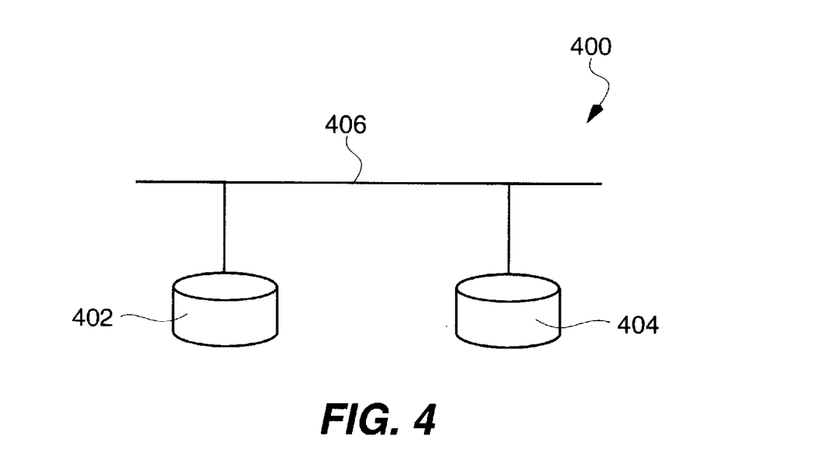
FIG. 4 is a block diagram of a global hot spare pool according to the present invention.

With reference now to FIG. 4, a block diagram of a global hot spare pool is depicted according to the present invention. Global hot spare pool (GHSP) 400 may be connect to bus 112, bus 114, or bus 122 in FIG. 1. GHSP 400 includes HSDs 402 and 404, which are connected to bus 406 in the depicted example. Disk drive storage subsystems 106, 108, and 110 share HSDs in GHSPs 116, 118, or 120. In the depicted example, each subsystem includes twelve HSDs.

According to the present invention, six HSDs are shared between the three disk drive storage subsystems. These HSDs are also called universal hot spare devices. Although in the depicted example, the HSDs are directly connected to bus 112, 114, or 122, an interface in the form of a controller also may be interposed between the HSDs and the bus for controlling access and moving data to and from the HSDs in the GHSP.

In the event that a disk drive in storage subsystems 106, 108, or 110 fails, the controller for managing the failed HSD, such as RAID controller 302 or 304, determines what free drive to use from either GHSP 116, 118 or 120. The controller then communicates with other subsystems within data processing system 100 via bus 112, 114, or 122 to reserve the selected HSD for its use. The controller uses the selected HSD to perform required hot sparing operations, which means that it uses the HSD as if it were part of its own subsystem. Once the failed drive in the subsystem has been repaired or replaced, the HSD is no longer needed and the controller communicates with other subsystems within data processing system 100 to free the HSD for use by another subsystem.

Figure 5:
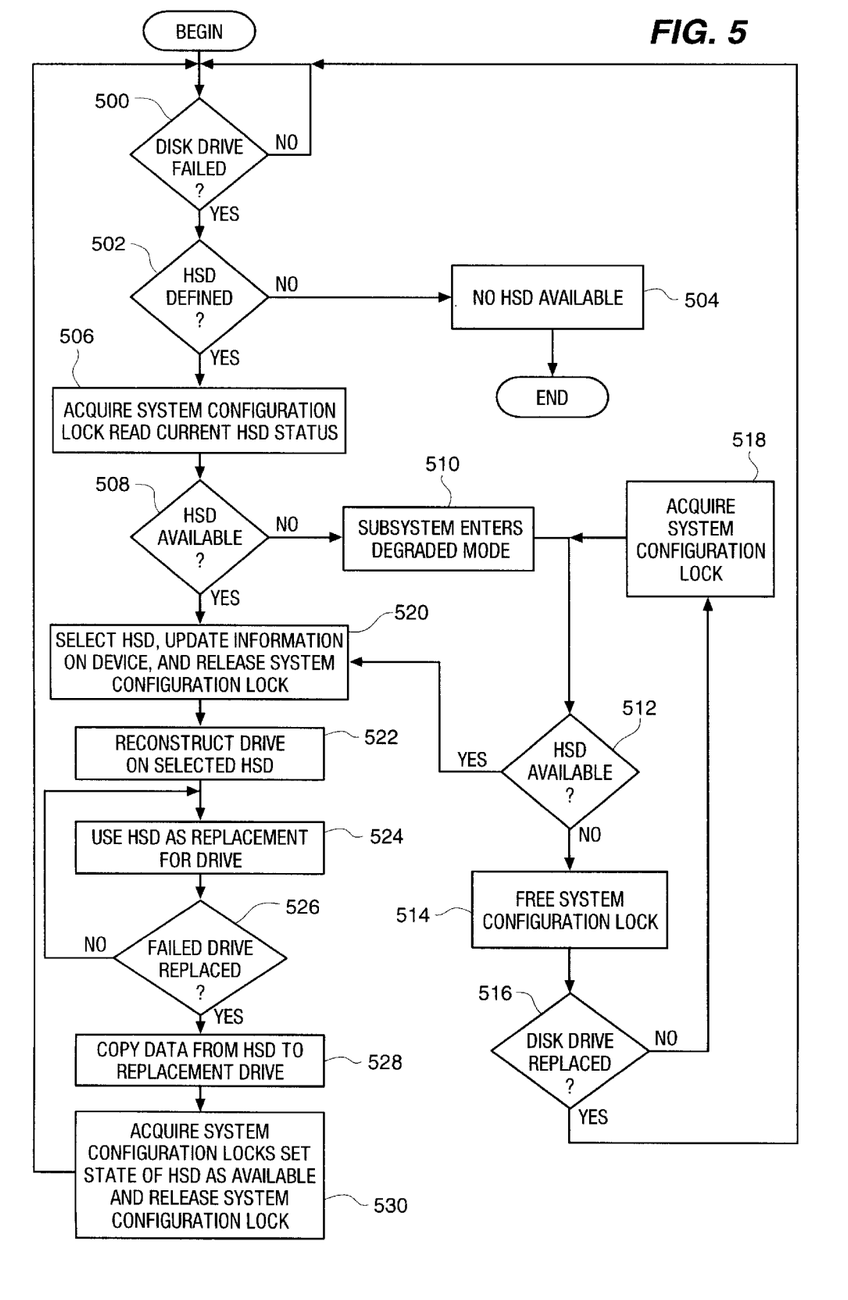
FIG. 5 is a flowchart of a process followed by a processor within one of the RAID controllers in FIG. 2 according to the present invention.

Turning now to FIG. 5, a flowchart of a process followed by a processor within one of the RAID controllers in FIG. 3 is depicted according to the present invention. The process begins by determining whether a disk drive in the subsystem has failed. If a disk drive in a subsystem has not failed, the processor remains at step 500. If a disk drive in the subsystem has failed (step 500), the process then determines whether an HSD has been defined for use by the subsystem (step 502). If an HSD has not been defined, the process indicates that no HSD is available (step 504) and then terminates because no HSD is available. Otherwise, the processor acquires "system configuration lock" to read a system configuration file which contains the current universal hot spare (HSD) status (step 506).

A "system configuration lock" is a token that allows a device to access a system configuration file, while preventing other devices from accessing the system configuration file. A "system configuration file" is a file or group of files that contain information on the status of devices within a data processing system. This information indicates whether a device is available for use. These configuration files may be found on multiple storage devices or multiple copies of the configuration file may be formed on different storage devices. Specifically, a system configuration file indicates whether an HSD may be used by a controller. A controller may check the system configuration file to determine whether HSDs are available for use. Additionally, when a controller selects an HSD for use, the information in the system configuration is updated to indicate that the HSD is now in use and unavailable for use by other subsystems.

After acquiring system configuration lock, the process determines whether an HSD is available (step 508). If an HSD is not available, the logical unit that corresponds to the address space enters a degraded mode (step 510).

The process then determines whether an HSD is available (step 512). If an HSD is not available, the system configuration lock is freed for use by another controller (step 514), allowing another device to use the system configuration lock. The process then determines whether the failed drive has been replaced (step 516). If the failed disk drive has not been replaced, the processor acquires system configuration lock (step 518) and returns to step 512, which is described above. If the disk drive has been replaced, the process then returns to step 500.

With reference again to step 512, if an HSD becomes available prior to the failed disk drive being replaced, the process then proceeds to claim the HSD for use by the subsystem, update the information in the system configuration file, and release the system configuration lock (step 520). The data for failed disk drive is reconstructed on the selected HSD (step 522). Thereafter, the HSD is used as a replacement for the failed disk drive (step 524). The process then determines whether the failed drive has been replaced (step 526). If the failed disk drive has not been replaced, the process returns to step 524 and the HSD continues to be used by the subsystem.

Upon replacement of the failed disk drive, the data is copied from the HSD to the new drive replacing the failed disk drive (step 528). Thereafter, the process acquires the system configuration lock, and sets the state of the HSD to indicate that the HSD is now available, and releases the system configuration lock for the HSD so that other controllers may use the released HSD (step 530). The process then returns to step 500.

Figure 6:
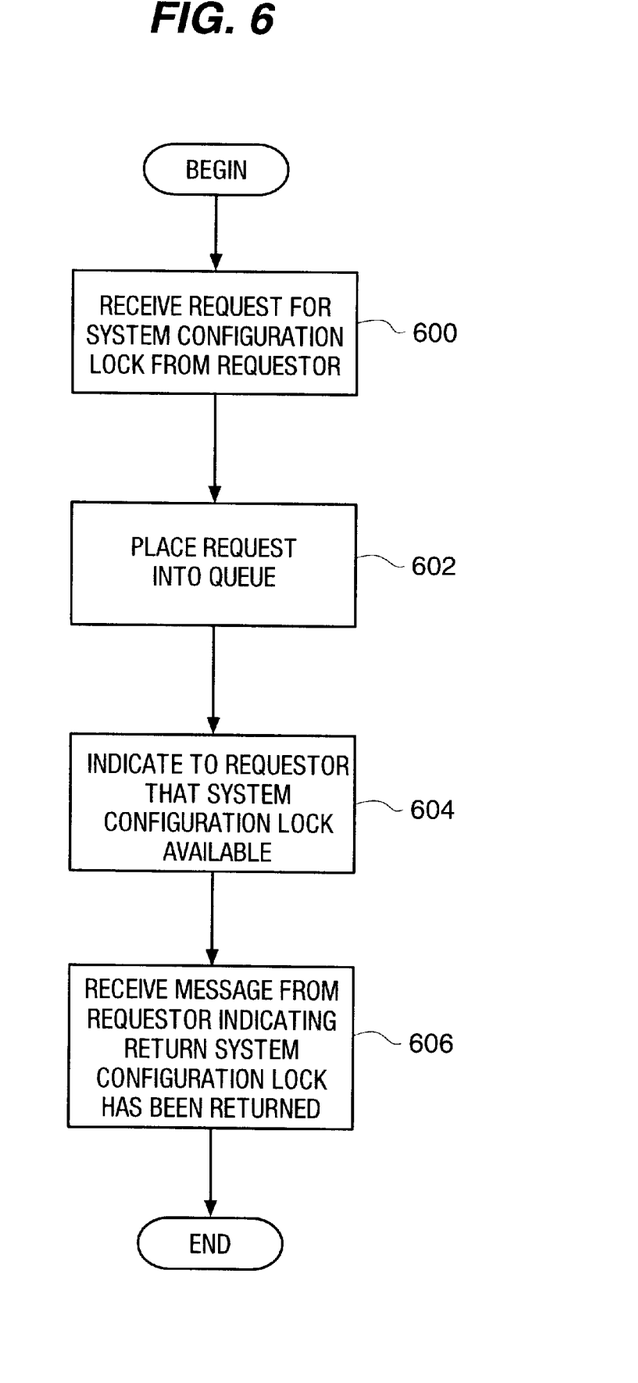
FIG. 6 is a flowchart of a process for handling system configuration locks according to the present invention.

With reference now to FIG. 6, a flowchart of a process for handling system configuration locks is depicted according to the present invention. These steps are implemented in a processor that is referred to as the "master controller". The master controller may be a processor within one of the RAID controllers in storage subsystems 106, 108, and 110. The master controller also may be implemented in another processor within data processing system 100 according to the present invention.

The process begins by receiving a request to provide system configuration lock to a requester (step 600). The requester is a controller in the depicted example. The request is placed into a queue for processing (step 602). Thereafter, a message is sent to the requester when the system configuration lock is available (step 604). The process then receives a message from the requester indicating that it is returning the system configuration lock to the master controller (step 602) with the process terminating thereafter.

Although the example depicted in the figures illustrates the use of HSDs in the form of disk drives, the same advantages of the present invention may be provided in systems using other storage devices, such as magnetic tapes or CD-ROMs. Additionally, the HSD may be a different media from the storage devices within a storage subsystem.

The processes shown in FIGS. 5 and 6 may be implemented within the systems depicted in FIGS. 1–4. The processes shown in FIGS. 5 and 6 may be implemented in computer system 200 or within a controller within one of the subsystems. The processes of the present invention also may be implemented as a computer program product in a storage device that is readable by a data processing system, wherein the storage device stores data processing system executable instructions for executing the processes of the present invention. The storage device containing such executable instructions may take various forms including, for example, but not limited to, a hard disk drive, a floppy disk, an optical disk, a ROM, a RAM, and an EPROM, all of which are known to those skilled in the art. The process which is stored on a storage device is dormant until activated by using the storage device with the data processing system.

For example, a hard disk drive containing data processing system executable instructions for the present invention may be connected to a processor in computer 200; a floppy disk containing data processing system executable instructions for the present invention may be inserted into a floppy disk drive in computer 200; or a ROM containing data processing system executable instructions may be connected to computer 200 or to a controller in subsystem 300.

The present invention provides an advantage over presently available storage subsystems by providing HSDs that may be shared between more than one subsystem. HSDs are connected to a bus that interconnects with more than one subsystem. Each of the subsystems may use one of the HSDs to replace a failed storage device within the subsystem. When one of the HSDs is being used, the other subsystems are notified that the HSD is in use, and therefore, unavailable for use by other subsystems. When an HSD is released, other subsystems are notified that it is now available. In this manner, the present invention allows for a reduction in the number of HSDs required in a data processing system that employs multiple subsystems.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for managing storage devices, the data processing system including a bus, and a plurality of storage subsystems connected to each other by the bus, each subsystem including a controller, wherein the controller provides an interface for controlling data transfers between one or more storage devices within the storage subsystem and the bus, the method comprising the steps of:

coupling at least one backup storage device to the bus such that the at least one backup storage device is independent from each of the plurality of storage subsystems and initially unassociated with each of the plurality of storage subsystems;

identifying a failed storage device within one of the plurality of storage subsystems; and utilizing an available one of the at least one backup storage device to replace the failed storage device such that the at least one backup storage device becomes associated with one of the plurality of storage subsystems containing the failed storage device.

2. The method of claim 1, wherein the step of utilizing includes reconstructing data from the failed storage device on the backup storage device.

3. The method of claim 2, wherein the step of reconstructing data from the failed storage device comprises utilizing data located on an unfailed storage device within the plurality of storage devices in the storage subsystem that contains the failed storage device data.

4. The method of claim 2, further comprising:

detecting a presence of a replacement storage device for the failed storage device; and reconstructing data on the replacement storage device using data on the backup storage device.

5. The method of claim 1 further comprising the steps of:
updating configuration information accessible to the plurality of storage subsystems with a status of the backup device; and
locking configuration information against access by storage subsystems other than the storage subsystem including the failed storage device.

6. A data processing system comprising:
a bus;
a plurality of storage subsystems connected to the bus, each storage subsystem including a plurality of storage devices and a controller, wherein the controller provides an interface for controlling data transfers between the storage devices and the bus;
a backup storage system connected to the bus which is independent from the plurality of storage subsystems and initially unassociated with the plurality of storage subsystems;
detection means for detecting a failure of a storage device within one of the plurality of storage subsystems; and
backup means for using the backup storage system to replace the failed storage device such that the at least one backup storage device becomes associated with one of the plurality of storage subsystems containing the failed storage device.

7. The data processing system of claim 6, wherein the backup storage system comprises a plurality of backup storage devices and the backup means comprises:
identification means for identifying a backup storage device within the plurality of backup storage devices that is available for reconstructing the failed storage device as an identified backup storage device; and
reconstruction means for reconstructing data previously stored on the failed storage device on the identified backup storage device.

8. The data processing system of claim 7, further comprising:
second identification means for identifying a replacement of the failed storage device by a replacement storage device; and
second reconstruction means for reconstructing data that is stored on the backup storage device on the identified replacement storage device.

9. The data processing system of claim 8, further comprising:
first marking means, responsive to the identification means for identifying a backup storage device, for marking the identified backup storage device as being unavailable for use; and
second marking means, responsive to the second reconstruction means, for marking the identified backup storage device as being available for use.

10. The data processing system of claim 7, wherein the reconstruction means for reconstructing data from the failed storage device comprises utilization means for utilizing data located on the storage devices within the plurality of storage devices that remain unfailed in the storage system that contains the failed storage device.

11. The data processing system of claim 6, further comprising:
second detection means for detecting a presence of a replacement storage device for the failed storage device; and
reconstruction means for reconstructing data on the replacement storage device using data on the backup storage system.

12. The data processing system of claim 7, wherein each of the storage subsystems devices comprises a plurality of hard disk drives.

13. The data processing system of claim 12, wherein the plurality of backup storage devices is a plurality of hard disk drives.

14. The data processing system of claim 12, wherein the plurality of storage devices is a plurality of tape drives.

15. The data processing system of claim 6, wherein the bus is a SCSI bus.

16. The data processing system of claim 6, wherein the bus is a fibre channel bus.

17. The data processing system of claim 6 further comprising:
a configuration file accessible to the plurality of storage subsystems, wherein the configuration file contains a status of the backup storage device; and
locking means for locking the configuration file against access by storage subsystems other than the storage subsystems including the failed storage device.

18. A data processing system comprising:
a bus system;
a plurality of storage subsystems connected to the bus system, each storage subsystem including a plurality of storage devices and a controller, wherein the controller provides data transfers between the storage devices and the bus; and
a backup storage system connected to the bus system which is independent from the plurality of storage subsystems and initially unassociated with the plurality of storage subsystems, the data processing system having a plurality of modes of operation including:
a first mode of operation in which the data processing system monitors the plurality of storage subsystems for a failure of a storage device; and
a second mode of operation in which the backup storage system is used to replace the failed storage device in response to detecting the failure of a storage device within one of the plurality of storage subsystems such that the backup storage system becomes associated with one of the plurality of storage subsystems containing the failed storage device.

19. The data processing system of claim 18, wherein the backup storage system comprises a plurality of storage devices.

20. The data processing system of claim 19, wherein the second mode of operation includes identifying a backup storage device within the plurality of backup storage devices that is available for reconstructing data from the failed storage device on the identified backup storage device.

21. The data processing system of claim 18, wherein the bus system comprises a first bus and a second bus.

22. The data processing system of claim 21, wherein the backup storage system is connected to the first bus and each of the plurality of storage subsystems are connected to the first bus and the second bus.

23. The data processing system of claim 22, further comprising a second backup storage system connected to the second bus.

24. The data processing system of claim 23, further comprising a computer system having a connection to the first bus and a connection to the second bus.

25. The data processing system of claim 24, wherein the data processing system further comprising a second computer system having a connection to the first bus and to the second bus.

26. The data processing system of claim 24, further comprising a third bus connected to each of the plurality of storage subsystems, and a third backup storage system connected to the third bus.

27. The data processing system of claim 24, further including:
   a third mode of operation in which a replacement storage device is identified for replacing the failed storage device; and
   a fourth mode of operation in which the backup storage system is replaced by the replacement storage device in response to identifying the replacement storage device for the failed storage device.

28. The data processing system of claim 18 further comprising configuration information accessible to the plurality of storage subsystems, the configuration information containing an indication of a status of the backup storage system, and wherein in the second mode of operation, responsive to detecting a failure of a storage device within one of the plurality of storage subsystems, the configuration information is locked against access by storage subsystems other than the storage subsystem including the failed storage device.

29. A data processing system comprising:
   a bus system;
   a backup storage system which is independent from a plurality of storage subsystems and initially unassociated with the plurality of storage subsystems;
   the plurality of storage subsystems being connected to the bus system, each storage subsystem within the plurality of storage subsystems including:
      a plurality of storage devices; and
      a controller, wherein the controller is connected to the plurality of storage devices and the bus system, the controller including a processor having a plurality of modes of operation including:
         a first mode of operation in which the controller monitors the storage subsystem for a failure of a storage device within the plurality of storage devices within the storage subsystem; and
         a second mode of operation in which the backup storage system is used to replace the failed storage device in response to detecting the failure of a storage device such that the backup storage system becomes associated with one of the plurality of storage subsystems containing the failed storage device.

30. A program storage device, readable by a data processing system, that maintains data processing system executable instructions for managing a plurality of storage subsystems, each storage subsystem being connected to a bus and including a plurality of storage devices, the program storage device comprising:
   first instruction means for detecting a failure of a storage device within one of the plurality of storage subsystems; and
   second instruction means for using a backup storage system which is independent from the plurality of storage devices and unassociated with the plurality of storage devices and connected to the bus to replace the failed storage device such that the backup storage system becomes associated with one of the plurality of storage subsystems containing the failed storage device, wherein the first and second instruction means are activated when the program storage device is connected to and accessed by the data processing system.

31. The program storage device of claim 30, wherein the storage device is a hard disk drive.

32. The program storage device of claim 30, wherein the storage device is a ROM.

33. The program storage device of claim 30; wherein the storage device is a floppy diskette.

34. The program storage device of claim 30 further comprising a third instruction means for locking configuration information containing a status of a backup storage system connected to the bus against access by storage subsystems other than the storage subsystem including the failed storage device.

* * * * *